United States Patent
Garmey et al.

(10) Patent No.: US 10,005,607 B2
(45) Date of Patent: Jun. 26, 2018

(54) VACUUM LID

(71) Applicants: Terrence Garmey, Cape Elizabeth, ME (US); Manuel Amaro, Chicago, IL (US)

(72) Inventors: Terrence Garmey, Cape Elizabeth, ME (US); Manuel Amaro, Chicago, IL (US)

( * ) Notice: Subject to any disclaimer, the term of this patent is extended or adjusted under 35 U.S.C. 154(b) by 0 days. days.

(21) Appl. No.: 15/315,463

(22) PCT Filed: Jul. 1, 2015

(86) PCT No.: PCT/US2015/038788
§ 371 (c)(1),
(2) Date: Dec. 1, 2016

(87) PCT Pub. No.: WO2016/004178
PCT Pub. Date: Jan. 7, 2016

(65) Prior Publication Data
US 2017/0101247 A1    Apr. 13, 2017

Related U.S. Application Data

(60) Provisional application No. 62/019,990, filed on Jul. 2, 2014.

(51) Int. Cl.
*B65D 25/14* (2006.01)
*B65D 81/20* (2006.01)
*B65D 25/28* (2006.01)
*B65D 51/16* (2006.01)
*A47J 47/06* (2006.01)

(52) U.S. Cl.
CPC .......... *B65D 81/2038* (2013.01); *A47J 47/06* (2013.01); *B65D 25/14* (2013.01); *B65D 25/28* (2013.01); *B65D 51/1683* (2013.01); *B65D 2525/283* (2013.01)

(58) Field of Classification Search
CPC .... B65D 81/2023; B65D 25/14; B65D 25/28; B65D 51/1683
USPC ...................................... 206/524.8
See application file for complete search history.

(56) References Cited

FOREIGN PATENT DOCUMENTS

JP         2003-20060    *    1/2003

* cited by examiner

*Primary Examiner* — King M Chu
(74) *Attorney, Agent, or Firm* — Vedder Price P.C.

(57) ABSTRACT

A vacuum lid for sealing a container. The vacuum lid is adapted to seal a container. The lid has a knob, either a twist knob or a push-pull knob, which, when twisted or pushed, forces air inside the container out through evacuation ports. This creates a vacuum inside the container, which aids in maintaining freshness of consumable foods or other substances that degrade over time in the presence of air.

3 Claims, 6 Drawing Sheets

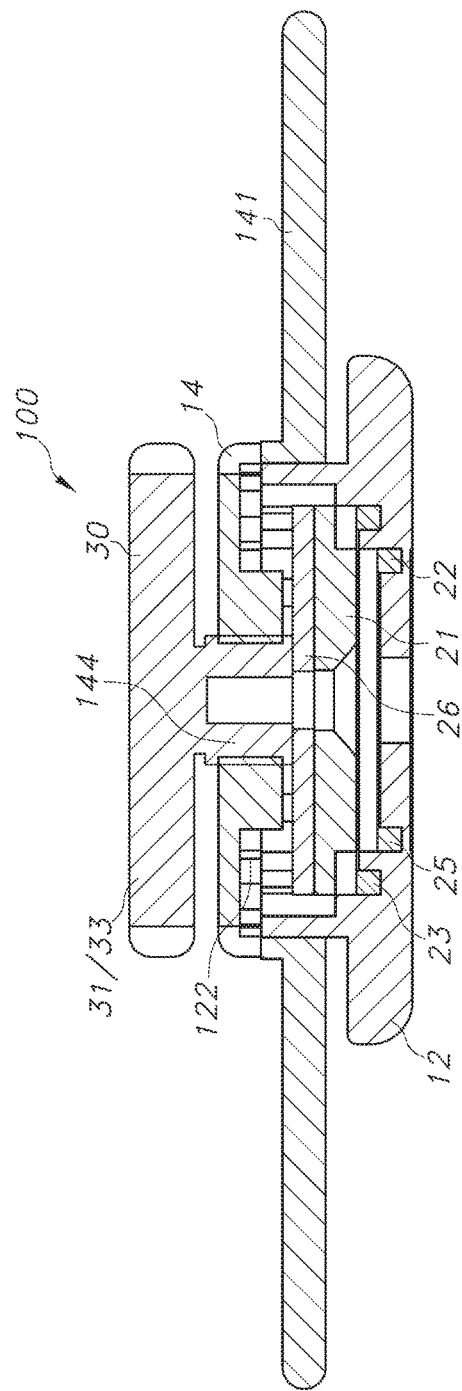
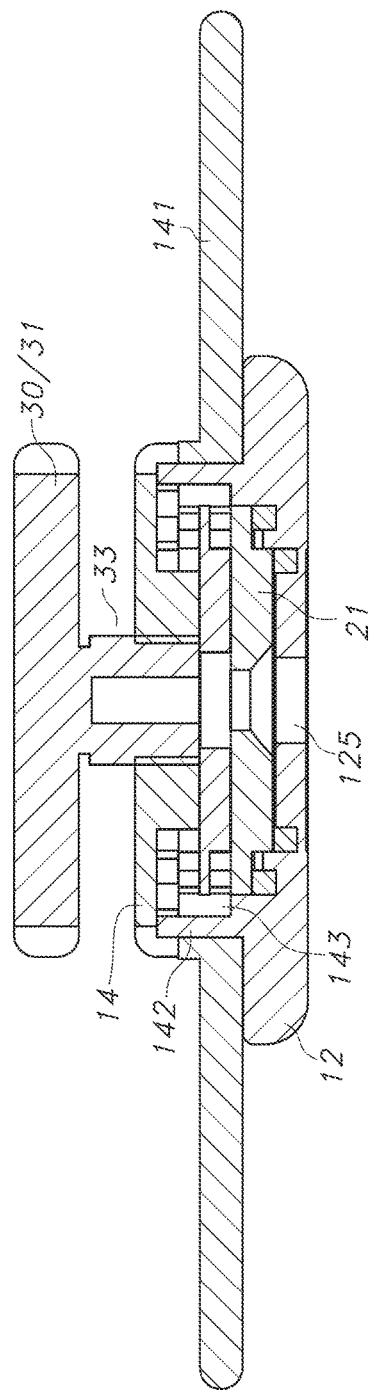

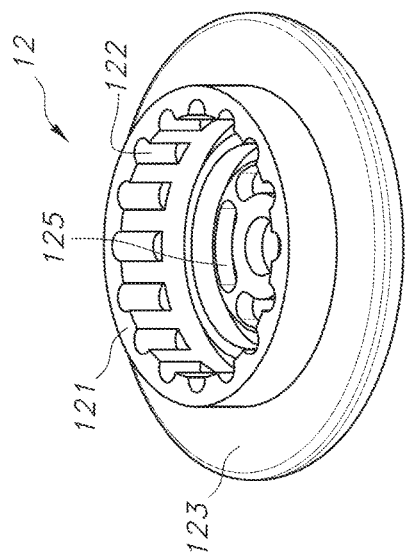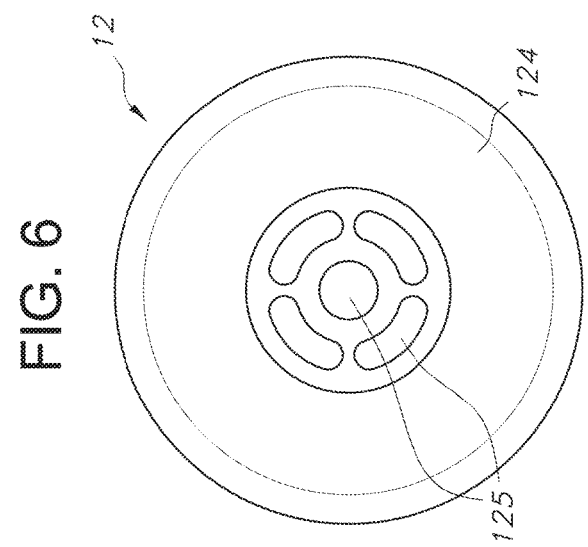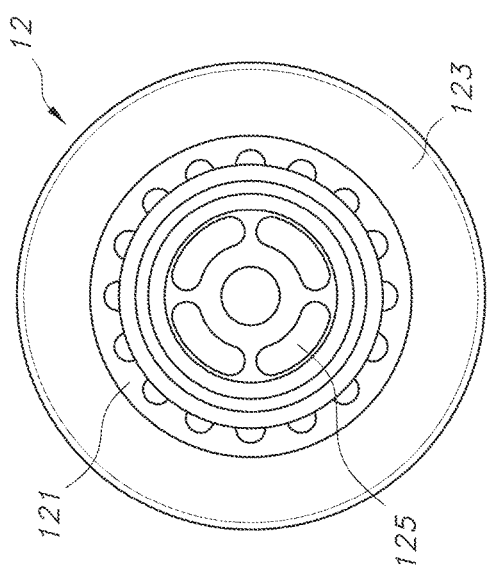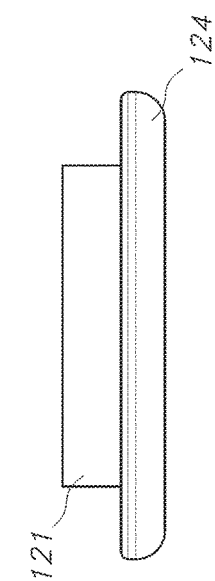

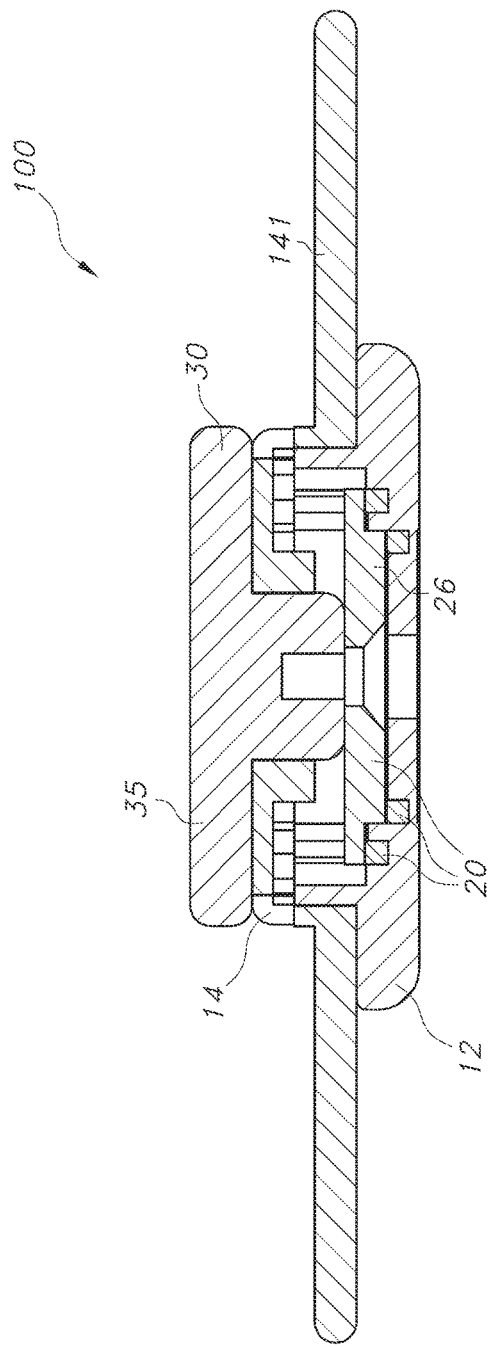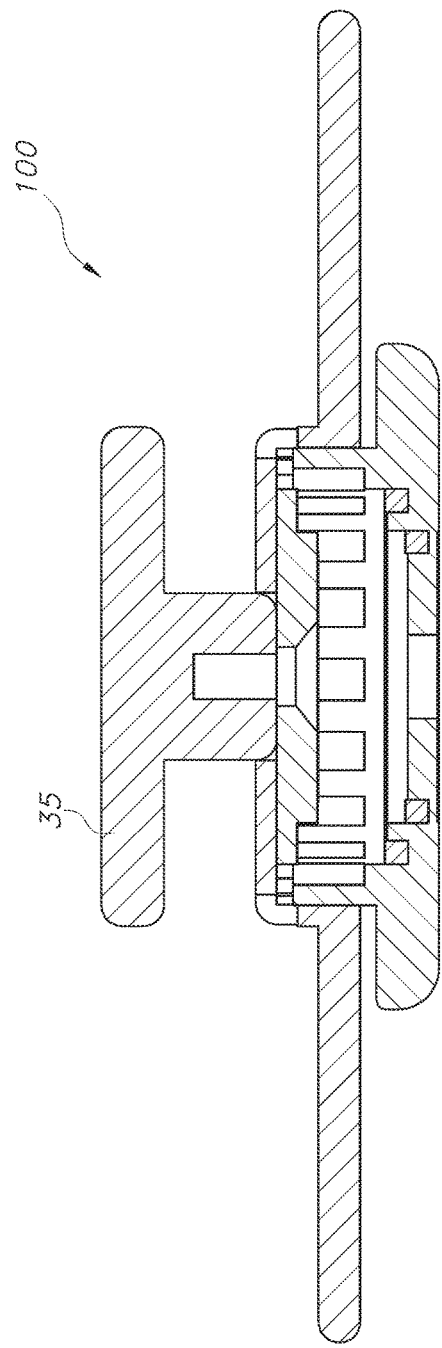

VACUUM LID

BACKGROUND INFORMATION

Field of the Invention

The invention relates to the field of lids for food and other types of containers. More particularly, the invention relates to vacuum lids.

Discussion of the Prior Art

It has long been a problem to keep foods fresh, after the container has been opened. This is particularly an issue with coffee, because the very desirable aroma of the coffee dissipates when the coffee is exposed to air over a period of time. Today, coffee is typically sold in containers or packages that initially have a vacuum seal. The seal is broken, however, once the container or package is opened.

What is needed is a vacuum lid that is inexpensive to manufacture and that effectively and repeatedly provides a vacuum seal on the container.

BRIEF SUMMARY OF THE INVENTION

The invention is a vacuum lid that may be used to provide a vacuum seal on a food container or other type of container. The discussion of the vacuum lid may hereinafter refer to a food container, but it is also understood, that the lid may be used to provide a vacuum seal on containers in general, regardless of the contents. Paint, for example, is a substance that degrades when exposed to air, and providing a container with a vacuum lid would be beneficial here, too.

The vacuum lid according to the invention has a housing with air ports in it. A rigid plate is assembled within the housing, such that there is an air-tight seal around the perimeter of the plate where it contacts the inner perimeter of the housing. The rigid plate is mounted such, that it is movable in a vertical direction. An actuation means, such as a twist knob or a push-pull knob, is assembled in the housing and is used to move the rigid plate downward. In so doing, air is forced from the container out through the air ports, creating a vacuum.

BRIEF DESCRIPTION OF THE DRAWINGS

The present invention is described with reference to the accompanying drawings. In the drawings, like reference numbers indicate identical or functionally similar elements. The drawings are not drawn to scale.

FIG. 1 is a cross-sectional view of a twist embodiment of the vacuum lid according to the invention, showing the lid closed.

FIG. 2 is a cross-sectional view of the embodiment of FIG. 1, showing the lid open.

FIG. 5 is a top plan view of the lower housing.

FIG. 6 is a perspective view of the lower housing.

FIG. 7 is a plan elevation view of the lower housing.

FIG. 8 is a bottom plan view of the lower housing.

FIG. 9 is a cross-sectional view of the push-pull embodiment of the lid according to the invention, showing the lid in a closed or sealed state.

FIG. 10 is a cross-sectional view of the embodiment of FIG. 9, showing the lid in a closed or sealed state.

DETAILED DESCRIPTION OF THE INVENTION

Figure 3:
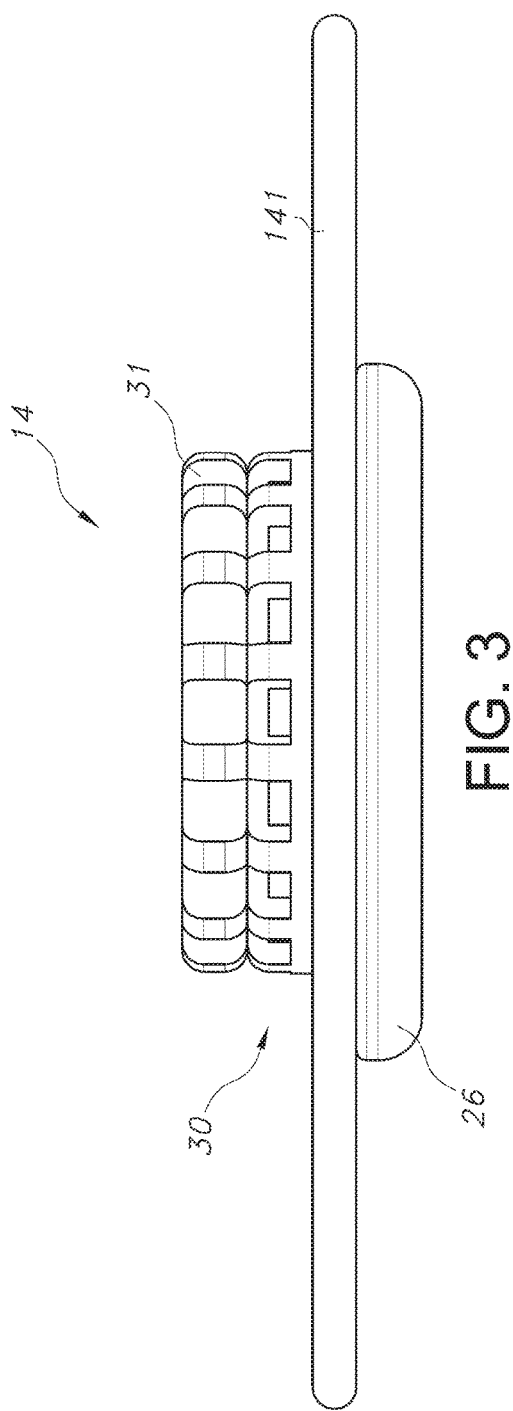
FIG. 3 is a elevation plan view of the lid and twist knob, showing the rigid plate beneath the lid flange.
Figure 4:
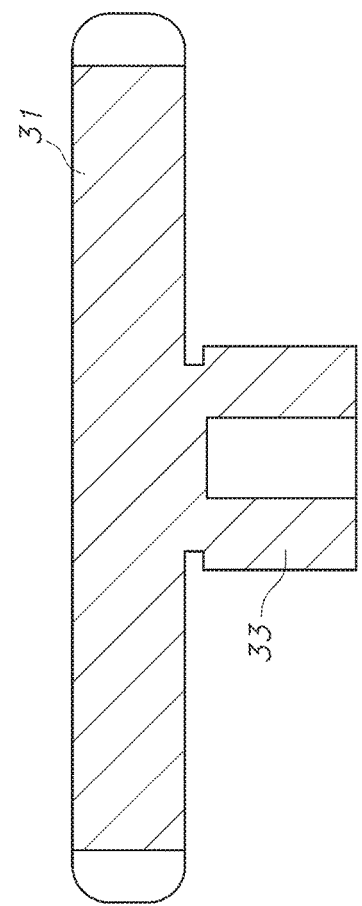
FIG. 4 is cross-sectional view of the twist knob and threaded shaft.

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

FIGS. 1-10 illustrate a vacuum lid device 100 according to the invention. The vacuum lid 100 comprises an upper housing 14, a lower housing 12, a lid flange 141, seal means 20, and an actuation means 30. The seal means 20 is assembled within the lower housing 12 and the actuation means 30 movably engages with the seal means 20, so as to selectively create and release a seal within the lid device 100. In the embodiment shown, the upper housing 14 and the lid flange 141 are a single integrated component. The upper housing 14 and lower housing 12 are fixedly fastened to each other after the seal means 20 and actuation means 30 have been assembled.

FIGS. 1-4 illustrate a first embodiment of the lid device 100 in which the actuation means 30 is a twist mechanism; FIGS. 5-8 illustrate details of the lower housing 12; and FIGS. 9 and 10 illustrate a second embodiment, in which the actuation means is a push-pull mechanism. The lower housing 12 is common to both embodiments.

Figure 12:
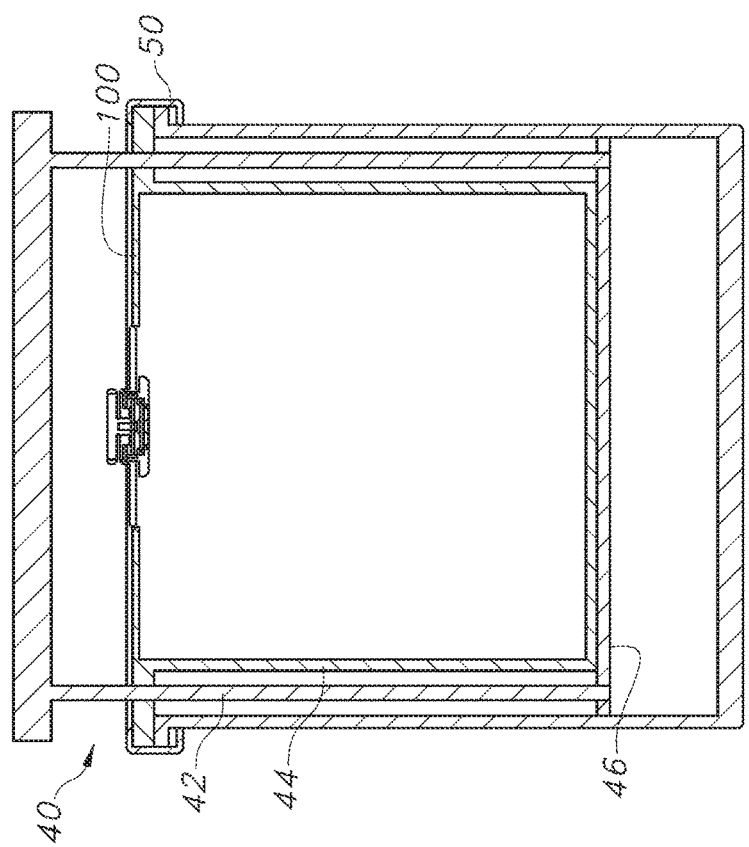
FIG. 12 is a view in cross-section, showing the handle and the bladder in a container with the lid according to the invention.
Figure 11:
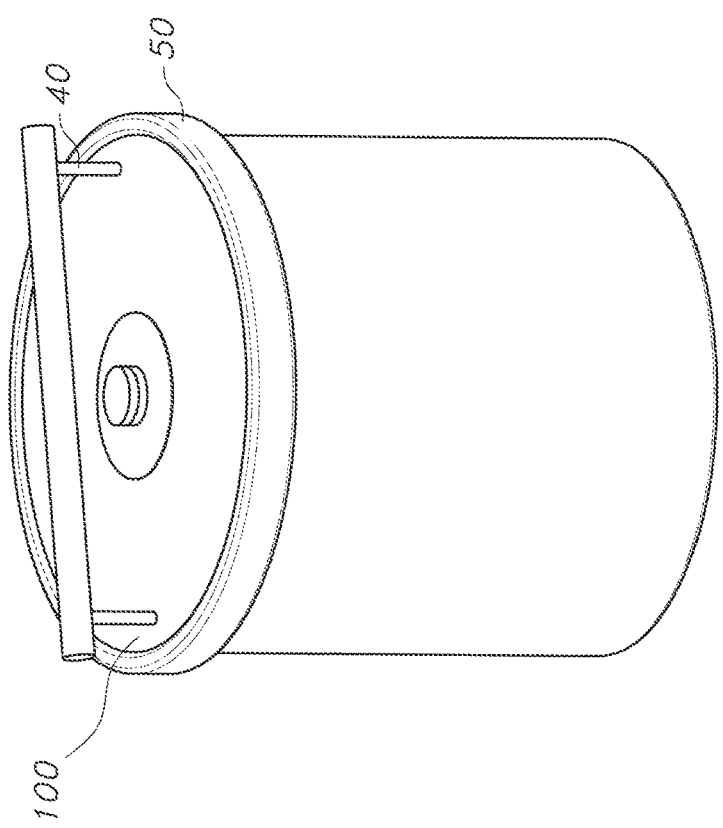
FIG. 11 illustrates a container with the lid according to the invention and an activation handle for activating a bladder inside the container.

FIGS. 1 and 2 show the lid device 100, in a closed or sealed state and in an open or unsealed state, respectively. Various methods of providing a sealed connection between a lid and a container are known and any of such suitable methods may be applied here. For example, a rubber or rigid ring 50 may be used to seal the lid device 100 to a container. See FIGS. 11 and 12. The ring 50 is dimensioned to have a stretch fit over the edge of the container and the circumferential edge of the lid 100 and snaps into place, thereby providing an air-tight seal of the lid with the container.

The lid flange 141 is fixedly connected with the upper housing 14, which has a circumferential wall 142 that extends upward from the flange 141. Evacuation ports 143 are provided in the circumferential wall 142. A threaded bore 144 for receiving the actuation means 30 extends through the center of the upper housing 14.

FIGS. 5-8 illustrate details of the lower housing 12, which encloses the seal means 20. The lower housing 12 has a lower housing wall 121 extending upward from a horizontal base 123. Air passageways 122 are provided in the housing wall 121 and air evacuation ports 125 provided in the base 123 as through-holes that extend through a bottom surface 124 of the base 123. In the embodiment shown, the evacuation ports 125 are evenly spaced about the bottom surface 124.

The seal means 20 includes a main seal 21, a first O-ring 22, a second O-ring 23, and a filter 25. The O-ring fit into respective seal grooves in the lower housing 12, as shown in FIG. 5.

The actuating means 30 in this first embodiment is a twist mechanism that includes a twist knob 31, a threaded shaft 33, and a rigid plate 26 that is affixed to a lower end of the threaded shaft 33. An easily grippable edge 32 may be provided around the perimeter of the twist knob 31. The twist knob 31 is movably connected with the upper housing 14 by means of the threaded shaft 33 in the threaded bore 144. by twisting the twist knob 31, the rigid plate 26 is forced either downward against the seal means 20 in the lower housing, thereby forcing air out through the various evacuation ports 143 and creating a seal, or upward away from the seal means, thereby releasing the seal and allowing air to flow into the container. The actuation means 30 in this first embodiment is a twist knob 31 that is attached to a rigid plate 26 and a main seal 21 by means of a fastener. Twisting the knob 31 in clockwise direction forces the rigid plate 26 down against the main seal 21. When the maximum downward motion is reached, the main seal 21 makes contact with a first O-ring 1 and a second O-ring 2, thereby creating a seal. The rigid plate 26 ensures a uniform support for the main seal 21. The downward motion forces air from the container up through the evacuation ports 125 in the bottom of the lower housing 12, through the main seal/filter 25 into the upper housing 14, where it escapes through the various evacuation ports 143. A counter clockwise motion of the twist knob 31 breaks the seal by pulling the rigid plate 26 away from the seal means 20. This allows air to rush through the device into the container, which then allows the container to be open easily.

FIGS. 9 and 10 illustrate a second embodiment of the vacuum lid device 100, in which the actuation means 30 is a push-pull mechanism. The lower housing 12 and seal means 20 are as described above for the first embodiment. A rigid or semi-rigid plate 26 is affixed to the upper face of the main seal 21. The push and pull mechanism is a one way valve construction that evacuates air in the sealed container by manually pressing on the actuation means, somewhat like a bellow or a plunger. Pressing on the push-pull knob 35 causes the main seal 21 to flex, which in turn causes air to escape out from the container.

This activation may also be accomplished by adding a bladder system 40 to the container. A bladder 44 lines the container and a handle 42 is connected to a plate 46. The handle 42 extends through the lid flange and the plate 46 is provided beneath a bottom surface of the bladder 44. See FIGS. 11 and 12. Pulling up on the activation handle 42 causes the bladder 44 to compress in the direction of the lid, thereby forcing air within the container to travel upward, which causes the main seal to flex upward, expelling air from the container out through the lid device 100. A single pull on the activation handle 42 creates the seal. Pushing on the activation handle presses the bladder downward, at which point, external air flows back into the container. The main seal 21 reverts to its original position, in which it has contact with the two O-rings 22 and 23. This effectively creates a double seal which prevents any external air from re-entering the bladder 44. The pull knob 35 is used to manually break the seal. As the knob is pulled in an upward motion, the seal with the O-rings 22 and 23 is broken, allowing air to re-enter the bladder 44. Once the air refills the bladder 44 the container can be easily opened.

Figure 14:
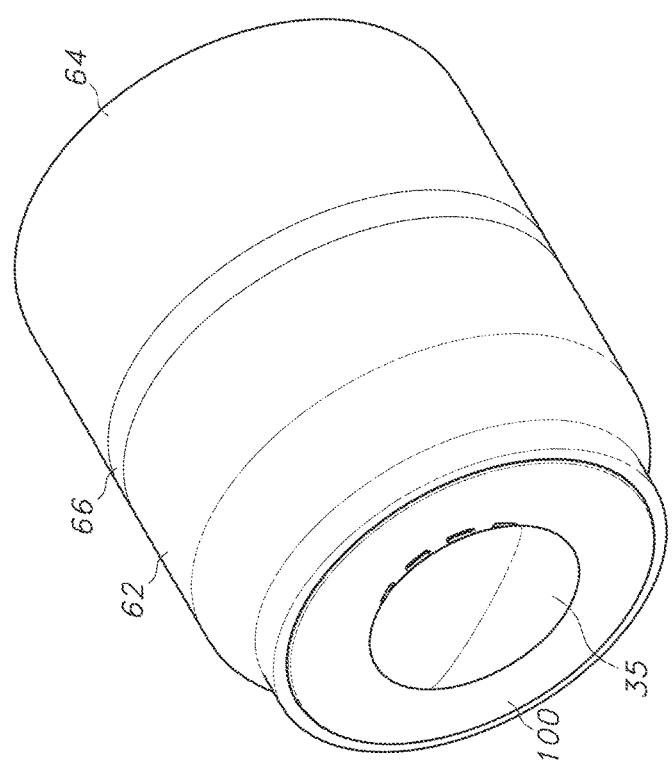
FIG. 14 is perspective view of the lid and container with the flexible upper section and rigid lower section.
Figure 13A:
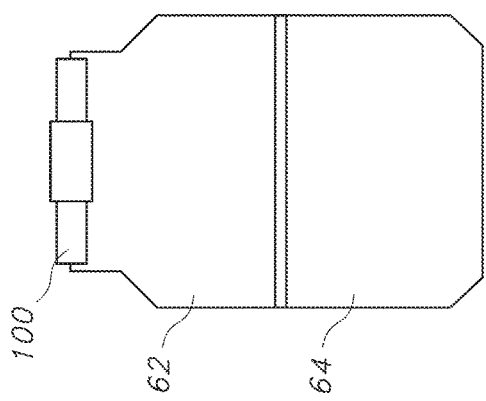
FIG. 13A is a side view of the container with a flexible upper section and rigid lower section with the lid.
Figure 13B:
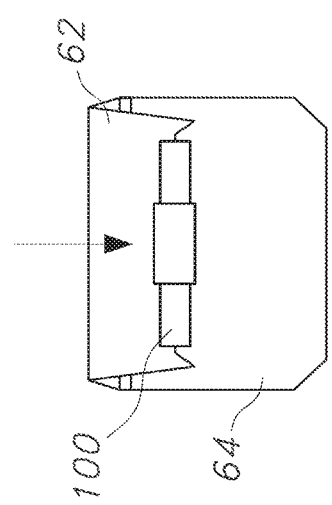
FIG. 13B is a cross-section view of the container with a flexible upper section that is compressed into the rigid lower section with the lid.

This second embodiment may also be used with a container 60 that has a flexible upper shell 62 and a rigid lower shell 64 as shown in FIGS. 13A-14, instead of the bladder system 40. A connector 66 joins the upper shell 62 to the lower shell 64. Pressing on the push-pull knob 35 causes the flexible upper shell 62 to compress as air escapes from the container until the flexible upper shell comes into contact with the contents of the container or the bottom of the rigid lower shell 64, at which point all or nearly all air is expelled and the seal is created. Pulling on the push-pull knob 35 breaks the seal. FIG. 13B illustrates the lid 100 and flexible upper shell 62 pressed part way into the lower rigid shell 64.

In both embodiments, the main seal 21 and the rigid plate 26 are connected the actuation means 30. There are various suitable ways of doing this. One way is to provide a shaft on the rigid plate that extends up into a bore in the twist knob or the push-pull knob and to fasten it with a screw or a rivet.

It is understood that the embodiments described herein are merely illustrative of the present invention. Variations in the construction of the vacuum lid may be contemplated by one skilled in the art without limiting the intended scope of the invention herein disclosed and as defined by the following claims.

What is claimed is:
1. A vacuum lid for a container, the vacuum lid comprising:
a housing that includes an upper housing and a lower housing;
a seal means for providing a seal within the housing; and
an actuation means that movably engages the seal means so as to selectively create and release a vacuum within the container;
wherein the lower housing has one or more evacuation ports through which air is evacuated from the container,
wherein the twist mechanism includes a twist knob that is movably connected to the upper housing by a threaded shaft that is inserted through a threaded bore in the upper housing, and
wherein twisting the twist knob in a first direction forces the rigid plate downward against the seal means, thereby forcing air out and creating the seal and in a second direction forces the rigid plate upward away from the seal means, thereby releasing the seal and allowing air into the container.

2. A vacuum lid for a container, the vacuum lid comprising:
a housing that includes an upper housing and a lower housing;
a seal means for providing a seal within the housing; and
an actuation means that movably engages the seal means so as to selectively create and release a vacuum within the container, and
wherein the lower housing has one or more evacuation ports through which air is evacuated from the container,
wherein the actuation means is a push-pull mechanism;
a bladder lining the container;
a handle that extends through the lid and connects to a plate that is positioned beneath a bottom surface of the bladder, and
wherein pulling the handle causes the bladder to compress in the direction of the lid, forcing air within the container to travel upward and causing the seal means to flex upward allowing the air to escape through the lid and creates the seal.

3. A vacuum lid for a container, the vacuum lid comprising:
- a housing that includes an upper housing and a lower housing;
- a seal means for providing a seal within the housing; and
- an actuation means that movably engages the seal means so as to selectively create and release a vacuum within the container, and
- wherein the lower housing has one or more evacuation ports through which air is evacuated from the container,
- wherein the actuation means is a push-pull mechanism,
- a container having a flexible upper shell and a rigid lower shell, and
- wherein pressing the push-pull mechanism moves the flexible upper shell downward towards the rigid lower shell, thereby causing air to escape through the lid and creating the seal.

* * * * *